US011898708B1

(12) United States Patent
Lu et al.

(10) Patent No.: US 11,898,708 B1
(45) Date of Patent: Feb. 13, 2024

(54) LIGHTING DEVICE HAVING INTEGRATED END CAP

(71) Applicant: Xiamen PVTECH Co., Ltd., Fujian (CN)

(72) Inventors: Fuxing Lu, Fujian (CN); Rongtu Liu, Fujian (CN); Huibao Luo, Fujian (CN); Zehu Dai, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/206,051

(22) Filed: Jun. 5, 2023

(30) Foreign Application Priority Data

Jan. 16, 2023 (CN) ......................... 202310075249.8

(51) Int. Cl.

| | |
|---|---|
| ***F21K 9/272*** | (2016.01) |
| ***F21K 9/275*** | (2016.01) |
| ***F21V 23/06*** | (2006.01) |
| ***F21S 4/24*** | (2016.01) |
| ***F21K 9/278*** | (2016.01) |
| *F21Y 103/10* | (2016.01) |

(52) U.S. Cl.
CPC .............. *F21K 9/272* (2016.08); *F21K 9/275* (2016.08); *F21K 9/278* (2016.08); *F21S 4/24* (2016.01); *F21V 23/06* (2013.01); *F21Y 2103/10* (2016.08)

(58) Field of Classification Search
CPC ........ F21V 2103/10; F21V 23/06; F21S 4/24; F21K 9/278; F21K 9/275; F21K 9/272
See application file for complete search history.

(56) References Cited

U.S. PATENT DOCUMENTS

2010/0317212 A1* 12/2010 Daily ........................ F21K 9/27 439/230
2023/0324031 A1* 10/2023 Jiang ....................... F21K 9/272 315/205

FOREIGN PATENT DOCUMENTS

CN 105444130 A * 3/2016 ............. F21K 9/272
CN 106224805 A * 12/2016 ............. F21K 9/272
EP 3193080 A1 * 7/2017

OTHER PUBLICATIONS

Innovation Q+ NPL Search (Year: 2023).*

* cited by examiner

*Primary Examiner* — Anabel Ton
(74) *Attorney, Agent, or Firm* — Winston Hsu

(57) ABSTRACT

A lighting device includes an end cap, a circuit board, a plurality of first and second connection pins and a tubular housing. The end cap includes a hollow cylindrical portion and a connection portion. The hollow cylindrical portion has an opening and an installation bottom surface, and an accommodating space is formed therebetween. The connection portion includes a plurality of first and second hollow connection tubes connected to the accommodating space. The circuit board is disposed on the installation bottom surface, and includes a plurality of first connection points and a plurality of second connection points. The first connection pins penetrate through the first hollow connection tubes respectively in order to connect to the first connection points. The second connection pins penetrate through the second hollow connection tubes respectively in order to connect to the second connection points. The tubular housing is connected to the end cap.

10 Claims, 8 Drawing Sheets

LIGHTING DEVICE HAVING INTEGRATED END CAP

BACKGROUND OF THE INVENTION

1. Field of the Invention

The present invention relates to a lighting device, in particular to a lighting device having integrated end cap.

2. Description of the Prior Art

Currently available light-emitting diode (LED) light tubes are usually connected in series via male and female connectors, while the components thereof are connected to each other by silicone wires or jump wires. The production efficiency of the above connection structure is low and the reliability thereof is also poor. In addition, the above connection structure is only applicable to the connection of a few light tubes, and cannot connect a large number of light tubes to each other in series. Therefore, the application of the above structure is limited.

SUMMARY OF THE INVENTION

One embodiment of the present invention provides a lighting device having integrated end cap, which includes an end cap, a circuit board, a plurality of first connection pins, a plurality of second connection pins and a tubular housing. The end cap includes a hollow cylindrical portion and a connection portion. The hollow cylindrical portion has an opening and an installation bottom surface, and an accommodating space is formed between the opening and the installation bottom surface. The connection portion includes a plurality of first hollow connection tubes and a plurality of second hollow connection tubes connected to the accommodating space. The circuit board is disposed on the installation bottom surface, and includes a plurality of first connection points and a plurality of second connection points. The first connection pins penetrate through the first hollow connection tubes respectively in order to connect to the first connection points. The second connection pins penetrate through the second hollow connection tubes respectively in order to connect to the second connection points. The tubular housing is connected to the end cap.

In one embodiment, the circuit board includes two curved portions opposite to each other and two straight portions opposite to each other.

In one embodiment, the circuit board has a plurality of recesses disposed around the circuit board and the inner wall of the hollow cylindrical portion has a plurality of protrusions corresponding to the recesses respectively.

In one embodiment, the first hollow connection tubes include a main connection tube and two assistant connection tubes. The main connection tube has a fixation post disposed on the outer wall thereof and the fixation post extends toward the direction of the central axis of the end cap. Each of the assistant connection tubes has a fixation hook disposed on the outer wall thereof and the fixation hook extends toward the direction of the central axis of the end cap.

In one embodiment, the main connection tube further has two positioning posts disposed on the outer wall thereof and the fixation post is disposed between the two positioning posts.

In one embodiment, each of the second hollow connection tubes has a plurality of limiting posts disposed on the outer wall thereof and the diameter of the circle formed by connecting the top surfaces of the limiting posts to each other is less than or equal to the internal diameter of the first hollow connection tubes.

In one embodiment, the lighting device further includes a light source board and a flexible board. The light source board is connected to the circuit board via the flexible board.

In one embodiment, the flexible board is a flexible circuit board.

In one embodiment, the circuit board has an electrical connection groove and the flexible board penetrates through the electrical connection groove in order to be fixed with and electrically connect to the circuit board.

In one embodiment, the circuit board further has a plurality of fixture positioning grooves and the electrical connection groove is disposed between the fixture positioning grooves.

The lighting device having integrated end cap in accordance with the embodiments of the present invention may have the following advantages:

(1) In one embodiment of the present invention, the lighting device has the integrated end cap. The integrated end cap includes an integrated connection structure having the male connector and the female connector. Thus, the lighting device can be connected to another lighting device via the integrated end cap. The above connection structure can significantly increase the quantity of the lighting devices connected to each other, and the stability and reliability of the connection structure can be greatly enhanced. Thus, the lighting device can conform to actual requirements.

(2) In one embodiment of the present invention, the lighting device has the integrated end cap. The integrated end cap has a multi-function fixation structure, which can provide not only the fixation function, but also the fool-proof function. Therefore, the integrated end cap can make the installation of the lighting device more convenient and can satisfy the requirements of users.

(3) In one embodiment of the present invention, the lighting device has the integrated end cap. The internal structure of the integrated end cap can be easily manufactured. Therefore, the efficiency of the production of the lighting device can be greatly increased, which can effectively reduce the manufacturing cost of the lighting device.

(4) In one embodiment of the present invention, the circuit board of the integrated end cap of the lighting device has a special structural design and includes a plurality of fixture positioning grooves. These fixture positioning grooves can decrease the external force applied to the protrusions on the inner wall of the hollow cylindrical portion during the fixture positioning process and absorb a part of the torque generated during the riveting process so as to avoid that the circuit board and the hollow cylindrical portion are damaged during the manufacturing process. Accordingly, the yield rate of the manufacturing process of the lighting device can be effectively increased.

(5) In one embodiment of the present invention, the circuit board of the lighting device can be fixed with a plurality of first connection pints and second connection pins via the riveting process, such that the circuit board can have a plurality of holes. These holes can make the internal space of the lighting device achieve air pressure balance, which can enhance the reliability of the lighting device and increase the heat dissipation performance of the lighting device.

(6) In one embodiment of the present invention, the circuit board of the integrated end cap of the lighting device can be connected to the light source board of the lighting device via a flexible board. The above structure can not only reduce the difficulty of the manufacturing process, but also can reduce noise. Thus, the manufacturing cost of the lighting device can be further reduced and the performance of the lighting device can be further improved.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
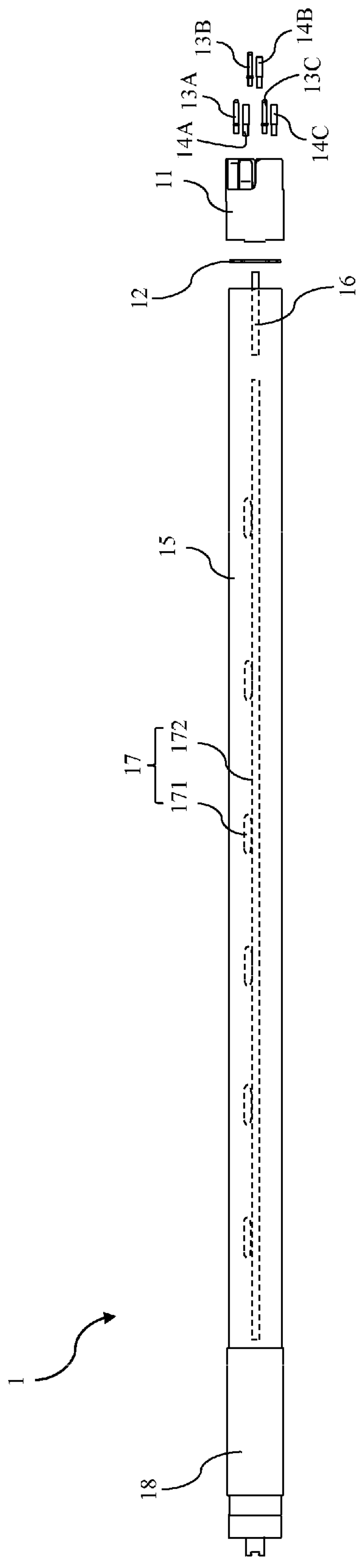
FIG. 1 is an exploded view of a lighting device having integrated end cap in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
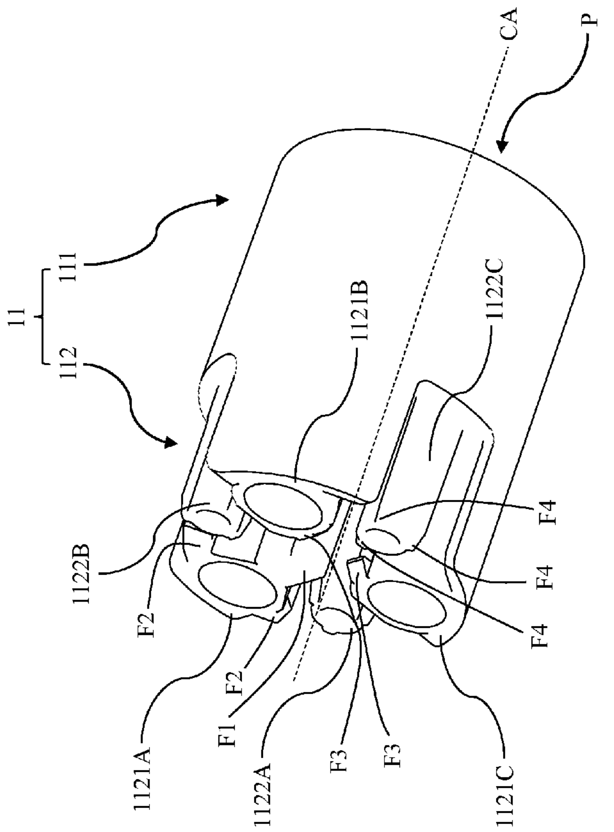
FIG. 2 is a schematic view of an end cap of the lighting device having integrated end cap in accordance with one embodiment of the present invention.
Figure 3:
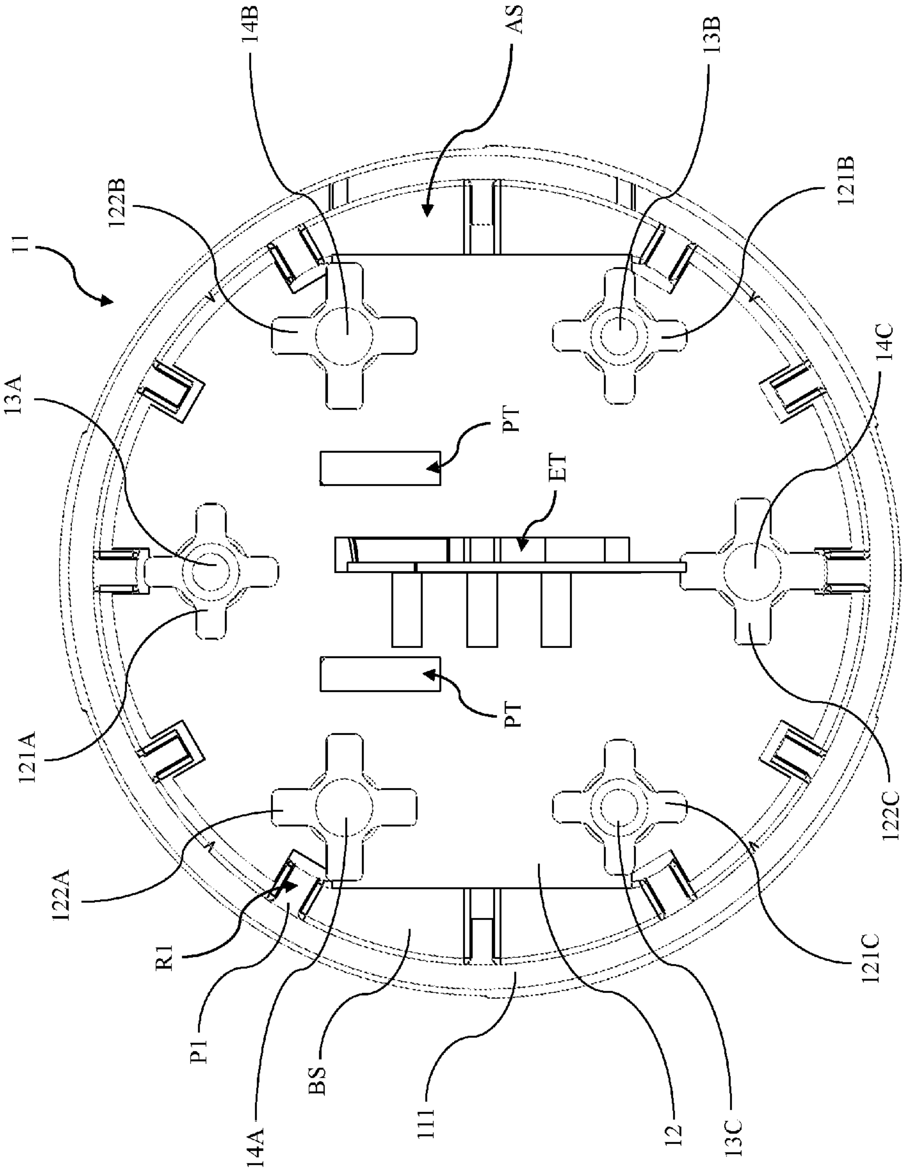
FIG. 3 is a top view of the end cap of the lighting device having integrated end cap in accordance with one embodiment of the present invention.
Figure 4:
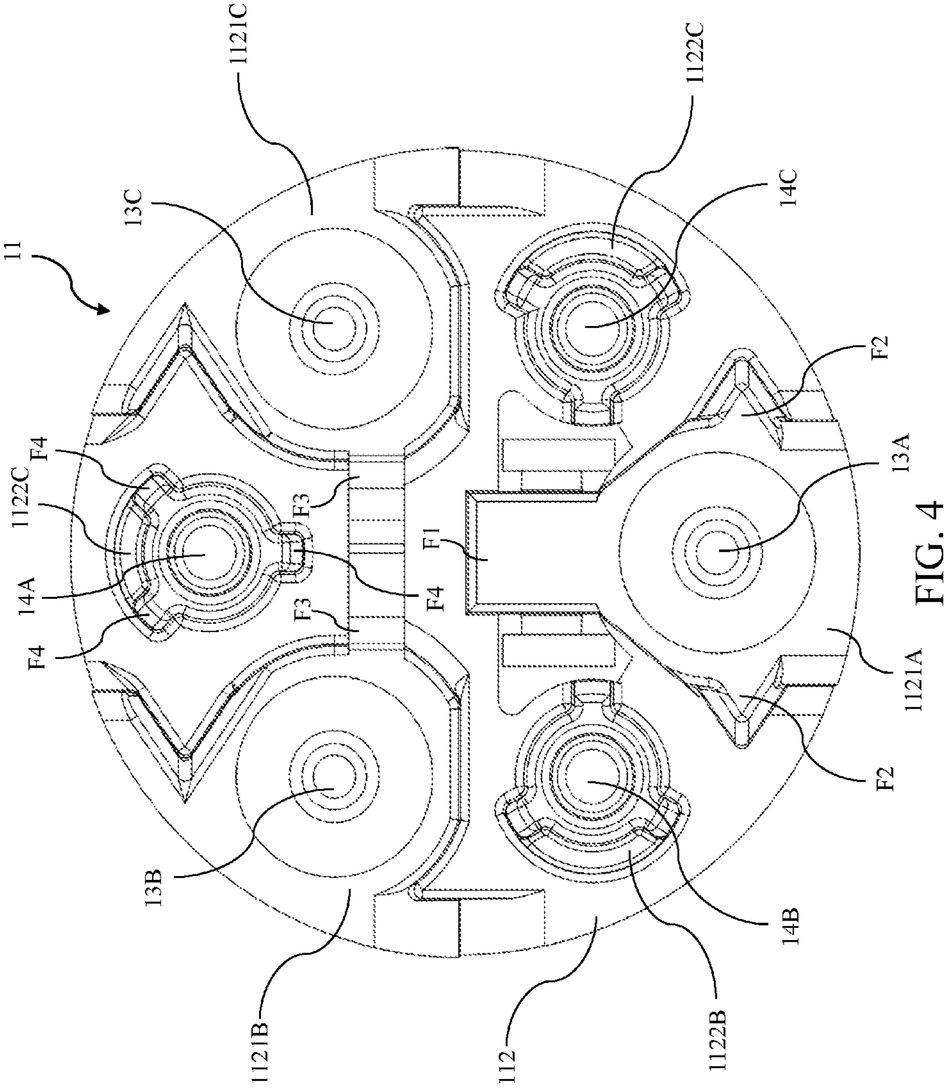
FIG. 4 is a bottom view of the end cap of the lighting device having integrated end cap in accordance with one embodiment of the present invention.

Please refer to FIG. 1, FIG. 2, FIG. 3 and FIG. 4. FIG. 1 is an exploded view of a lighting device having integrated end cap in accordance with one embodiment of the present invention. FIG. 2 is a schematic view of an end cap of the lighting device having integrated end cap in accordance with one embodiment of the present invention. FIG. 3 is a top view of the end cap of the lighting device having integrated end cap in accordance with one embodiment of the present invention. FIG. 4 is a bottom view of the end cap of the lighting device having integrated end cap in accordance with one embodiment of the present invention. As shown in FIG. 1, FIG. 2, FIG. 3 and FIG. 4, the lighting device 1 includes an end cap, a circuit board 12, a plurality of first connection pins 13A, 13B, 13C, a plurality of second connection pins 14A, 14B, 14C, a tubular housing 15, a flexible board 16, a light source board 17 and an electrical connector 18. In the embodiment, the above first connection pins 13A, 13B, 13C may be male pins and the second connection pins 14A, 14B, 14C may be female pins. The above first connection pins 13A, 13B, 13C may be corresponding to the live wire (L), the neutral wire (N) and the alternating current wire (AC) respectively. Similarly, the above second connection pins 14A, 14B, 14C may be corresponding to the live wire (L), the neutral wire (N) and the alternating current wire (AC) respectively.

The end cap 11 includes a hollow cylindrical portion 111 and a connection portion 112. The hollow cylindrical portion 111 has an opening P and an installation bottom surface BS, such that an accommodating space AS is formed between the opening P and the installation bottom surface BS. The connection portion 112 includes a plurality of first hollow connection tubes 1121A, 1121B, 1121C and a plurality of second hollow connection tubes 1122A, 1122B, 1122C connected to the accommodating space AS.

The circuit board 12 is disposed on the installation bottom surface BS, and includes a plurality of first connection points 121A, 121B, 121C and a plurality of second connection points 122A, 122B, 122C. The first connection pins 13A, 13B, 13C penetrate through the first hollow connection tubes 1121A, 1121B, 1121C respectively in order to connect to the first connection points 121A, 121B, 121C. The second connection pins 14A, 14B, 14C penetrate through the second hollow connection tubes 1122A, 1122B, 1122C respectively in order to connect to the second connection points 122A, 122B, 122C. The above first connection points 121A, 121B, 121C may be corresponding to the live wire (L), the neutral wire (N) and the alternating current wire (AC) respectively. Similarly, the above second connection points 122A, 122B, 122C may be corresponding to the live wire (L), the neutral wire (N) and the alternating current wire (AC) respectively. The power supplier, driver and other necessary electronic components can be disposed on the circuit board 2.

The light source board 17 is connected to the circuit board 12 via the flexible board 16. The light source board 17 includes a carrier board 171 (e.g., printed circuit board) and a plurality of light sources 172. These light sources 172 may be light-emitting diodes (LED). In one embodiment, the flexible board 16 may be a flexible circuit board.

One end of the tubular housing 15 is connected to the end cap 11 and the other end thereof is connected to the electrical connector 18. The tubular housing 15 may be made of a transparent material or translucent material, such as glass, plastics, etc.

The first hollow connection tube 1121A is the main connection tube; the first hollow connection tubes 1121B, 1121C are the assistant connection tubes. The first hollow connection tube 1121A (the main connection tube) has a fixation post F1 and two positioning posts F2. The fixation post F1 extends toward the direction of the central axis CA of the end cap 11 and is disposed between the two positioning posts F2. The first hollow connection tube 1121B (the assistant connection tube) has a fixation hook F3 disposed on the outer wall thereof and the fixation hook F3 also extends toward the direction of the central axis CA of the end cap 11. The first hollow connection tube 1121C (the assistant connection tube) also has the same structure. In this way, when two lighting devices 1 are connected to each other, the second hollow connection tubes 1122A, 1122B, 1122C of the end cap 11 of one of the lighting devices 1 are respectively inserted into the first hollow connection tubes 1121A, 1121B, 1121C of the end cap 11 of the other of the lighting devices 1. Meanwhile, the fixation post F1 of the first hollow connection tube 1121A can be fixed by the fixation hooks F2 of the first hollow connection tubes 1121B, 1121C. Moreover, the two positioning posts F2 of the first hollow connection tube 1121A can fill the space between the first hollow connection tubes 1121B, 1121C. Accordingly, the stability and reliability of this connection structure can be effectively enhanced.

Each of the second hollow connection tubes 1122A, 1122B, 1122C has a plurality of limiting posts F4 disposed on the outer wall thereof. The diameter of the circle formed by connecting top surfaces of the limiting posts F4 to each other is less than or equal to the internal diameter of the first hollow connection tubes 1121A, 1121B, 1121C. In this way, when two lighting devices 1 are connected to each other, the second hollow connection tubes 1122A, 1122B, 1122C of the end cap 11 of one of the lighting devices 1 are respectively inserted into the first hollow connection tubes 1121A, 1121B, 1121C of the end cap 11 of the other of the lighting devices 1. Meanwhile, the top surfaces of the limiting posts F4 can press against the inner walls of the first hollow connection tubes 1121A, 1121B, 1121C. In this way, the stability and reliability of the connection structure can be effectively enhanced. As set forth above, the end cap 11 has the multi-function fixation structure; the multi-function fixation structure can provide not only the fixation function, but also the foolproof function. Therefore, the end cap 11 can make the installation of the lighting device 1 be more convenient so as to conform to the requirements of users.

After the two lighting devices 1 are connected to each other, the end caps 11 of the lighting devices 1 can be electrically connected to each other via the above structure in order to form a long light tube. After the long light tube is installed on the tube light holder, a complete loop can be formed, such that the long light tube can be driven to emit light.

As previously stated, the lighting device 1 has an integrated end cap 11, and the integrated end cap 11 has the integrated connection structure including the male connector and the female connector. Thus, the lighting device 1 can be connected to the integrated end cap 11 of another lighting device 1 via this integrated end cap 11. The above connection structure can significantly increase the quantity of the lighting devices 1 connected to each other, and the stability and reliability of the connection structure can be greatly enhanced. Thus, the lighting device can conform to actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that the production efficiency of the connection structure of currently available lighting devices is low and the reliability thereof is also poor. In addition, the above connection structure is only applicable to the connection of a few light tubes, and cannot connect a large number of light tubes to each other in series. Therefore, the application of the above structure is limited. On the contrary, according to one embodiment of the present invention, the lighting device has the integrated end cap. The integrated end cap includes an integrated connection structure having the male connector and the female connector. Thus, the lighting device can be connected to another lighting device via the integrated end cap. The above connection structure can significantly increase the quantity of the lighting devices connected to each other, and the stability and reliability of the connection structure can be greatly enhanced. Thus, the lighting device can conform to actual requirements.

According to one embodiment of the present invention, the lighting device has the integrated end cap. The integrated end cap has a multi-function fixation structure, which can provide not only the fixation function, but also the fool-proof function. Therefore, the integrated end cap can make the installation of the lighting device more convenient and can satisfy the requirements of users.

Also, according to one embodiment of the present invention, the lighting device has the integrated end cap. The internal structure of the integrated end cap can be easily manufactured. Therefore, the efficiency of the production of the lighting device can be greatly increased, which can effectively reduce the manufacturing cost of the lighting device.

Further, according to one embodiment of the present invention, the circuit board of the integrated end cap of the lighting device has a special structural design and includes a plurality of fixture positioning grooves. These fixture positioning grooves can decrease the external force applied to the protrusions on the inner wall of the hollow cylindrical portion during the fixture positioning process and absorb a part of the torque generated during the riveting process so as to avoid that the circuit board and the hollow cylindrical portion are damaged during the manufacturing process. Accordingly, the yield rate of the manufacturing process of the lighting device can be effectively increased.

Moreover, according to one embodiment of the present invention, the circuit board of the lighting device can be fixed with a plurality of first connection pints and second connection pins via the riveting process, such that the circuit board can have a plurality of holes. These holes can make the internal space of the lighting device achieve air pressure balance, which can enhance the reliability of the lighting device and increase the heat dissipation performance of the lighting device.

Furthermore, according to one embodiment of the present invention, the circuit board of the integrated end cap of the lighting device can be connected to the light source board of the lighting device via a flexible board. The above structure can not only reduce the difficulty of the manufacturing process, but also can reduce noise. Thus, the manufacturing cost of the lighting device can be further reduced and the performance of the lighting device can be further improved. As described above, the lighting device having integrated end cap according to the embodiments of the present invention can definitely achieve great technical effects.

Figure 5:
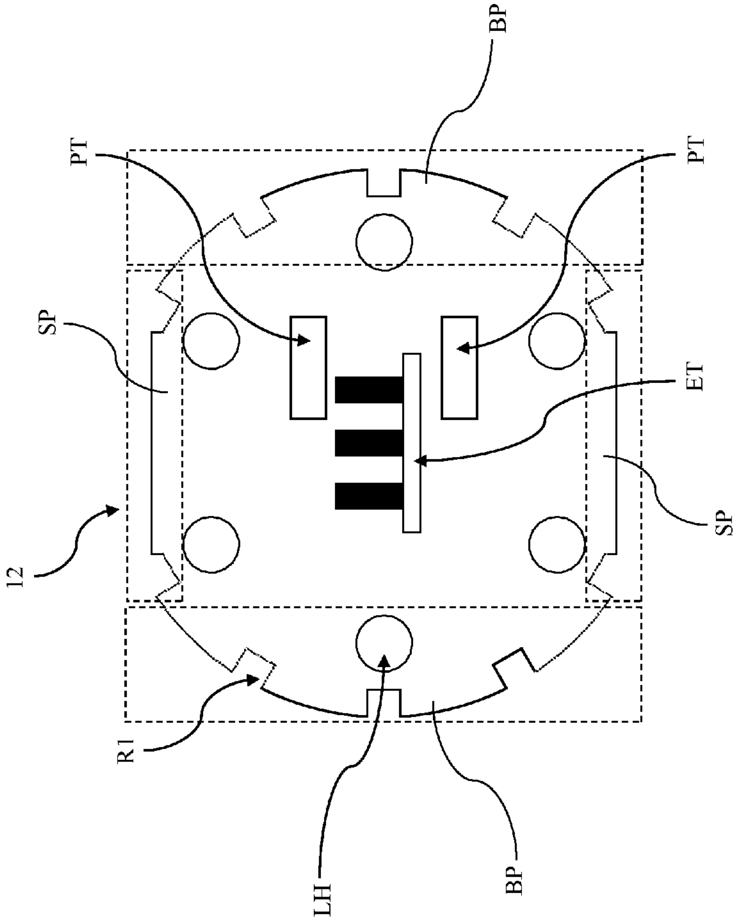
FIG. 5 is a top view of a circuit board of the lighting device having integrated end cap in accordance with one embodiment of the present invention.

Please refer to FIG. 5, which is a top view of a circuit board of the lighting device having integrated end cap in accordance with one embodiment of the present invention; please also refer to FIG. 3. As shown in FIG. 5, the circuit board 12 has 6 connection holes LH. The circuit board 12 can be fixed with the first connection pins 13A, 13B, 13C and the second connection pins 14A,14B, 14C via the above connection holes LH by the riveting process. Therefore, the circuit board 12 can have a plurality of holes. These holes can make the internal space of the lighting device 1 achieve air pressure balance, which can enhance the reliability of the lighting device 1 and increase the heat dissipation performance of the lighting device 1.

The circuit board 12 has a plurality of recesses R1 disposed around the circuit board 12 and the inner wall of the hollow cylindrical portion 111 has a plurality of protrusions P1 corresponding to the recesses R1 respectively and the protrusions P1 are evenly distributed over the inner wall of the hollow cylindrical portion 111. When the circuit board 12 is disposed on the installation bottom surface BS of the hollow cylindrical portion 111, the above recesses R1 of the circuit board 12 can be engaged with the protrusions P1 of the hollow cylindrical portion 111.

Further, the circuit board 12 includes two curved portions BP and two straight portions SP. The curved portions BP are opposite to each other and the two straight portions SP are opposite to each other. When the circuit board 12 is installed on the installation bottom surface BS of the hollow cylindrical portion 111, the above structural design can reduce the interference between the circuit board 12 and the hollow cylindrical portion 111 with a view to decreasing the difficulty of the manufacturing process.

Moreover, the circuit board 12 has an electrical connection groove ET and two fixture positioning grooves PT. The electrical connection groove ET is disposed between the two fixture positioning grooves PT. The flexible board 16 penetrates through the electrical connection groove ET to be fixed with and electrically connected to the circuit board 12. When the fixture positioning process is executed, the fixtures can be engaged with the two fixture positioning grooves PT in order to reduce the external force applied to the inner wall of the protrusions P1 of the hollow cylindrical portion 111. In addition, the two fixture positioning grooves PT can absorb a part of the torque generated during the riveting process. Accordingly, the structural design of the circuit board 12 can effectively avoid that the circuit board 12 and the hollow cylindrical portion 111 are damaged during the manufacturing process with a view to increasing the yield rate of the manufacturing process of the lighting device 1.

The embodiment just exemplifies the present invention and is not intended to limit the scope of the present invention; any equivalent modification and variation according to the spirit of the present invention is to be also included within the scope of the following claims and their equivalents.

Figure 6:
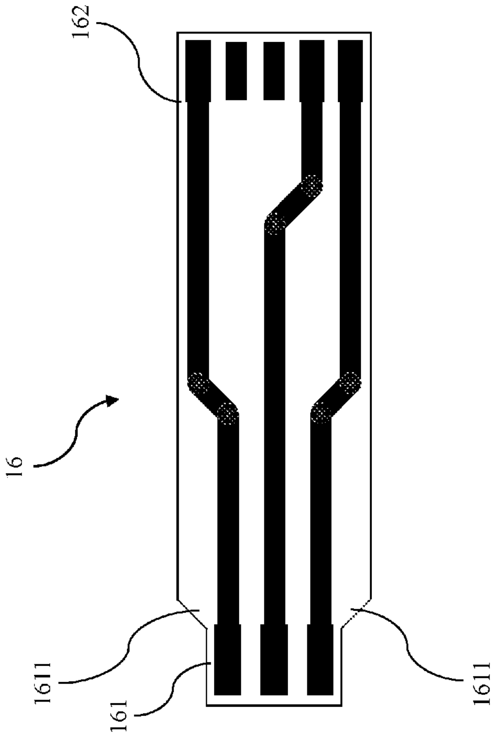
FIG. 6 is a top view of a flexible board of the lighting device having integrated end cap in accordance with one embodiment of the present invention.
Figure 7:
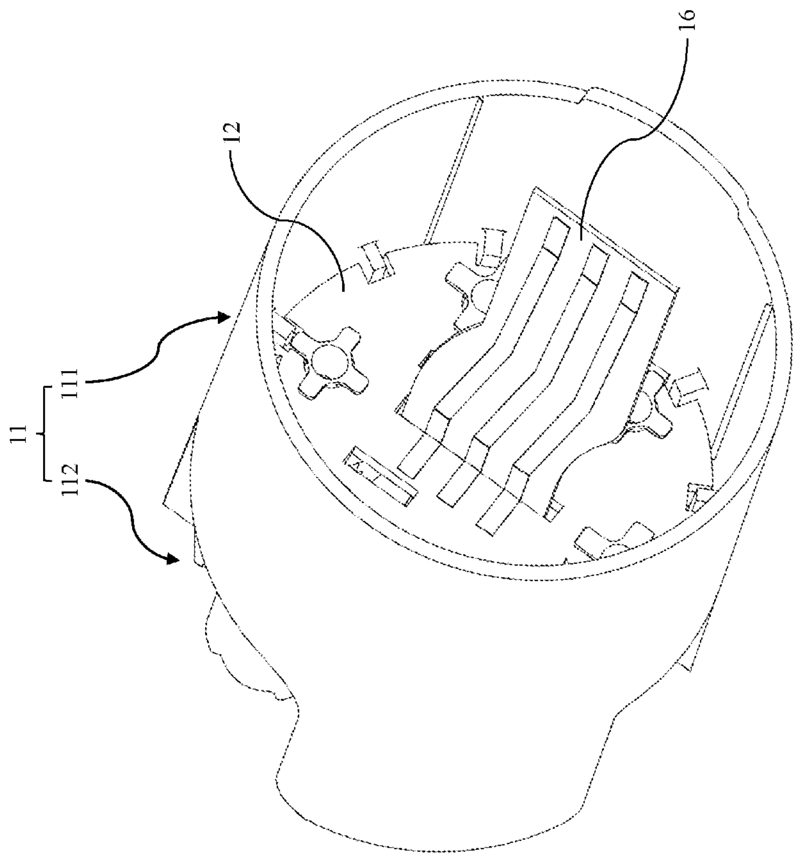
FIG. 7 is a schematic view of a combination structure of the flexible board and the circuit board of the lighting device having integrated end cap in accordance with one embodiment of the present invention.

Please refer to FIG. 6 and FIG. 7. FIG. 6 is a top view of a flexible board of the lighting device having integrated end cap in accordance with one embodiment of the present invention. FIG. 7 is a schematic view of a combination structure of the flexible board and the circuit board of the lighting device having integrated end cap in accordance with one embodiment of the present invention. As shown in FIG. 6 and FIG. 7, the flexible board 16 has a welding end 161 and a connection end 162, and the width of the connection end 162 is greater than the width of the welding end 161. In addition, there are two slope portions 1611 between the welding end 161 and the connection end 162. The welding end 161 of the flexible board 16 penetrates through the electrical connection groove ET of the circuit board 12, and is fixed on the circuit board 12 by welding. The two slope portions 1611 make the flexible board 16 be able to easily penetrate through the electrical connection groove ET in order to be fixed on and electrically connected to the circuit board 12. The connection end 162 of the flexible board 16 is electrically connected to the light source board 17.

As described above, the circuit board 12 can be connected to the light source board 17 via the flexible board 16, which can not only reduce the difficulty of the manufacturing process, but also can decrease noise. Therefore, the manufacturing cost of the lighting device 1 can be further reduced. Besides, the performance of the lighting device 1 can be effectively enhanced.

The embodiment just exemplifies the present invention and is not intended to limit the scope of the present invention; any equivalent modification and variation according to the spirit of the present invention is to be also included within the scope of the following claims and their equivalents.

Figure 8:
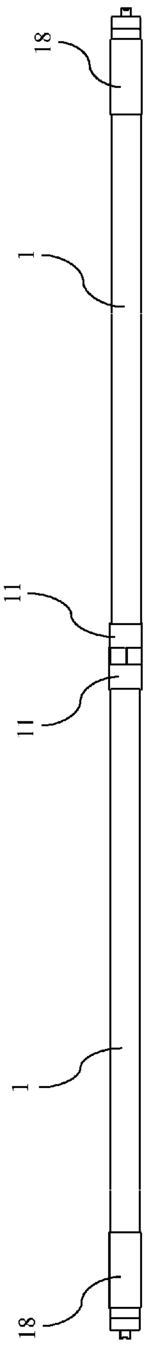
FIG. 8 is a schematic view of the two lighting devices connected to each other in accordance with one embodiment of the present invention.

Please refer to FIG. 8, which is a schematic view of the two lighting devices connected to each other in accordance with one embodiment of the present invention. As shown in FIG. 8, when two lighting devices 1 are connected to each other, the second hollow connection tubes 1122A, 1122B, 1122C of the end cap 11 of one of the lighting devices 1 are respectively inserted into the first hollow connection tubes 1121A, 1121B, 1121C of the end cap 11 of the other of the lighting devices 1. In this way, the two lighting devices 1 can be fixed with each other and electrically connected to each other in order to form a long light tube. After the electrical connectors 18 of the two lighting devices 1 are inserted into the two ends of the tube light holder, a complete loop can be formed, such that the long light tube can be driven to emit light.

One or more lighting devices 1 can be disposed between the two lighting devices 1. The two ends of any one of the lighting devices 1 can be provided with two end caps 11 respectively, such that these lighting devices 1 can be connected to each other. Therefore, three or more lighting devices 1 can be connected to each other to form a long light tube. Thus, the above connection structure can significantly increase the quantity of the lighting devices 1 connected to each other. In addition, the stability and reliability of the above connection structure can be greatly enhanced so as to meet actual requirements.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device has the integrated end cap. The integrated end cap includes an integrated connection structure having the male connector and the female connector. Thus, the lighting device can be connected to another lighting device via the integrated end cap. The above connection structure can significantly increase the quantity of the lighting devices connected to each other, and the stability and reliability of the connection structure can be greatly enhanced. Thus, the lighting device can conform to actual requirements.

According to one embodiment of the present invention, the lighting device has the integrated end cap. The integrated end cap has a multi-function fixation structure, which can provide not only the fixation function, but also the fool-proof function. Therefore, the integrated end cap can make the installation of the lighting device more convenient and can satisfy the requirements of users.

Also, according to one embodiment of the present invention, the lighting device has the integrated end cap. The internal structure of the integrated end cap can be easily manufactured. Therefore, the efficiency of the production of the lighting device can be greatly increased, which can effectively reduce the manufacturing cost of the lighting device.

Further, according to one embodiment of the present invention, the circuit board of the integrated end cap of the lighting device has a special structural design and includes a plurality of fixture positioning grooves. These fixture positioning grooves can decrease the external force applied to the protrusions on the inner wall of the hollow cylindrical portion during the fixture positioning process and absorb a part of the torque generated during the riveting process so as to avoid that the circuit board and the hollow cylindrical portion are damaged during the manufacturing process. Accordingly, the yield rate of the manufacturing process of the lighting device can be effectively increased.

Moreover, according to one embodiment of the present invention, the circuit board of the lighting device can be fixed with a plurality of first connection pints and second connection pins via the riveting process, such that the circuit board can have a plurality of holes. These holes can make the internal space of the lighting device achieve air pressure balance, which can enhance the reliability of the lighting device and increase the heat dissipation performance of the lighting device.

Furthermore, according to one embodiment of the present invention, the circuit board of the integrated end cap of the lighting device can be connected to the light source board of the lighting device via a flexible board. The above structure can not only reduce the difficulty of the manufacturing process, but also can reduce noise. Thus, the manufacturing cost of the lighting device can be further reduced and the performance of the lighting device can be further improved.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having integrated end cap, comprising:

an end cap comprising a hollow cylindrical portion and a connection portion, wherein the hollow cylindrical portion has an opening and an installation bottom surface, and an accommodating space is formed between the opening and the installation bottom surface, wherein the connection portion comprises a plurality of first hollow connection tubes and a plurality of second hollow connection tubes connected to the accommodating space;

a circuit board disposed on the installation bottom surface, and comprising a plurality of first connection points and a plurality of second connection points;

a plurality of first connection pins penetrating through the first hollow connection tubes respectively in order to connect to the first connection points;

a plurality of second connection pins penetrating through the second hollow connection tubes respectively in order to connect to the second connection points; and a tubular housing connected to the end cap.

2. The lighting device having integrated end cap as claimed in claim 1, wherein the circuit board comprises two curved portions opposite to each other and two straight portions opposite to each other.

3. The lighting device having integrated end cap as claimed in claim 1, wherein the circuit board has a plurality of recesses disposed around the circuit board and an inner wall of the hollow cylindrical portion has a plurality of protrusions corresponding to the recesses respectively.

4. The lighting device having integrated end cap as claimed in claim 1, wherein the first hollow connection tubes comprises a main connection tube and two assistant connection tubes, wherein the main connection tube has a fixation post disposed on an outer wall thereof and the fixation post extends toward a direction of a central axis of the end cap, wherein each of the assistant connection tubes has a fixation hook disposed on an outer wall thereof and the fixation hook extends toward the direction of the central axis of the end cap.

5. The lighting device having integrated end cap as claimed in claim 4, wherein the main connection tube further has two positioning posts disposed on the outer wall thereof and the fixation post is disposed between the two positioning posts.

6. The lighting device having integrated end cap as claimed in claim 4, wherein each of the second hollow connection tubes has a plurality of limiting posts disposed on an outer wall thereof and a diameter of a circle formed by connecting top surfaces of the limiting posts to each other is less than or equal to an internal diameter of the first hollow connection tubes.

7. The lighting device having integrated end cap as claimed in claim 1, further comprises a light source board and a flexible board, wherein the light source board is connected to the circuit board via the flexible board.

8. The lighting device having integrated end cap as claimed in claim 7, wherein the flexible board is a flexible circuit board.

9. The lighting device having integrated end cap as claimed in claim 7, wherein the circuit board has an electrical connection groove and the flexible board penetrates through the electrical connection groove in order to be fixed with and electrically connect to the circuit board.

10. The lighting device having integrated end cap as claimed in claim 9, wherein the circuit board further has a plurality of fixture positioning grooves and the electrical connection groove is disposed between the fixture positioning grooves.

* * * * *